(12) United States Patent
Ma et al.

(10) Patent No.: US 10,573,226 B1
(45) Date of Patent: Feb. 25, 2020

(54) DISPLAY PANEL AND DISPLAY DEVICE

(71) Applicant: WUHAN TIANMA MICRO-ELECTRONICS CO., LTD., Wuhan (CN)

(72) Inventors: Yangzhao Ma, Wuhan (CN); Tianqing Hu, Shanghai (CN); Zhaokeng Cao, Shanghai (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 16/224,119

(22) Filed: Dec. 18, 2018

(30) Foreign Application Priority Data

Oct. 31, 2018 (CN) .......................... 2018 1 1284113

(51) Int. Cl.
*G09G 3/22* (2006.01)
*G06F 1/16* (2006.01)

(52) U.S. Cl.
CPC .............. *G09G 3/22* (2013.01); *G06F 1/1605* (2013.01); *G06F 1/1652* (2013.01); *G09G 2310/0264* (2013.01)

(58) Field of Classification Search
CPC .............. G09G 3/22; G09G 2310/0264; G06F 1/1605; G06F 1/1652
See application file for complete search history.

(56) References Cited

U.S. PATENT DOCUMENTS

| | | | | |
|---|---|---|---|---|
| 8,593,061 | B2 * | 11/2013 | Yamada | H01L 27/3293 313/503 |
| 2016/0093596 | A1 * | 3/2016 | Hong | H01L 25/167 257/72 |
| 2018/0074361 | A1 * | 3/2018 | Chung | G02F 1/13452 |
| 2018/0183001 | A1 * | 6/2018 | Lee | H01L 51/5246 |
| 2018/0190747 | A1 * | 7/2018 | Son | G06F 3/1446 |
| 2019/0206333 | A1 * | 7/2019 | Kim | G09G 3/32 |

* cited by examiner

*Primary Examiner* — Ricardo Osorio
(74) *Attorney, Agent, or Firm* — Anova Law Group PLLC

(57) ABSTRACT

A display panel and a display device are provided. The display panel comprises a display area; a non-display area surrounding the display area and including a first non-display area and a second non-display area disposed on opposite sides of the display area in a row direction; a first scanning driving circuit disposed at the first non-display area; a second scanning driving circuit and a light-emitting controlling circuit disposed at the second non-display area; and at least one notch. The display area includes an irregular-shaped side which is a common boundary between the display area and the first non-display area. The irregular-shaped side includes at least one sub-edge, and the at least one sub-edge is recessed towards an inside of the display area to form the at least one notch.

17 Claims, 20 Drawing Sheets

DISPLAY PANEL AND DISPLAY DEVICE

CROSS-REFERENCES TO RELATED APPLICATIONS

This application claims the priority of Chinese Patent Application No. CN201811284113.3, filed on Oct. 31, 2018, the entire contents of all of which are incorporated herein by reference.

FIELD OF THE DISCLOSURE

The present disclosure generally relates to the display technology and, more particularly, relates to a display panel and a display device thereof.

BACKGROUND

As display technology continuously advances, display devices trend to have a lighter and thinner structure as well as narrower frame. In particular, for display devices having a narrow frame, because the frame is narrowed, a higher screen-to-body ratio is realized. Accordingly, users watch the display device more visually relaxed, and the degree of visual constraint is greatly reduced, providing immersive experience.

To increase the screen-to-body ratio of the display device, an existing display panel is often designed to have a shape other than a regular rectangle, such as a convex polygon, a concave polygon, a circle, etc., and such a display panel is often named as an irregular-shaped display panel. The irregular-shaped display panel can bypass some functional modules in the display device, such as a camera module, a speaker module, etc., thereby by increasing the screen-to-body ratio. However, the wiring layout at the frame may become denser, degrading the display performance.

Therefore, how to improve the screen-to-body ratio of the display device to continuously enhance the user's viewing experience is a technical problem, which is highly desired to be solved in the industry. The disclosed display panel and display device thereof are directed to solve one or more problems set forth above and other problems.

BRIEF SUMMARY OF THE DISCLOSURE

One aspect of the present disclosure provides a display panel. The display panel comprises a display area including a plurality of scanning lines, a plurality of light-emitting controlling lines and a plurality of data lines; a non-display area surrounding the display area; a first scanning driving circuit, a second scanning driving circuit and a light-emitting controlling circuit; and at least one notch. The plurality of scanning lines and the plurality of light-emitting controlling lines extend in a row direction, and the plurality of data lines extend in a column direction. The non-display area includes a first non-display area and a second non-display area disposed on opposite sides of the display area in the row direction. The first scanning driving circuit is disposed at the first non-display area. The second scanning driving circuit and the light-emitting controlling circuit are disposed at the second non-display area. The light-emitting controlling circuit includes a plurality of cascaded light-emitting controllers, and an output terminal of a light-emitting controller is electrically connected to at least one light-emitting controlling line. The display area includes an irregular-shaped side, and the irregular-shaped side is a common boundary between the display area and the first non-display area. The irregular-shaped side includes at least one sub-edge, and the at least one sub-edge is recessed towards an inside of the display area to form the at least one notch.

Another aspect of the present disclosure provides a display device. The display device comprises a display panel. The display panel comprises a display area including a plurality of scanning lines, a plurality of light-emitting controlling lines and a plurality of data lines; a non-display area surrounding the display area; a first scanning driving circuit, a second scanning driving circuit and a light-emitting controlling circuit; and at least one notch. The plurality of scanning lines and the plurality of light-emitting controlling lines extend in a row direction, and the plurality of data lines extend in a column direction. The non-display area includes a first non-display area and a second non-display area disposed on opposite sides of the display area in the row direction. The first scanning driving circuit is disposed at the first non-display area. The second scanning driving circuit and the light-emitting controlling circuit are disposed at the second non-display area. The light-emitting controlling circuit includes a plurality of cascaded light-emitting controllers, and an output terminal of a light-emitting controller is electrically connected to at least one light-emitting controlling line. The display area includes an irregular-shaped side, and the irregular-shaped side is a common boundary between the display area and the first non-display area. The irregular-shaped side includes at least one sub-edge, and the at least one sub-edge is recessed towards an inside of the display area to form the at least one notch.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure. Further, in the present disclosure, the disclosed embodiments and the features of the disclosed embodiments may be combined under conditions without conflicts.

The present disclosure provides an improved display panel and display device thereof which are capable of enhancing viewing experience.

Figure 1:
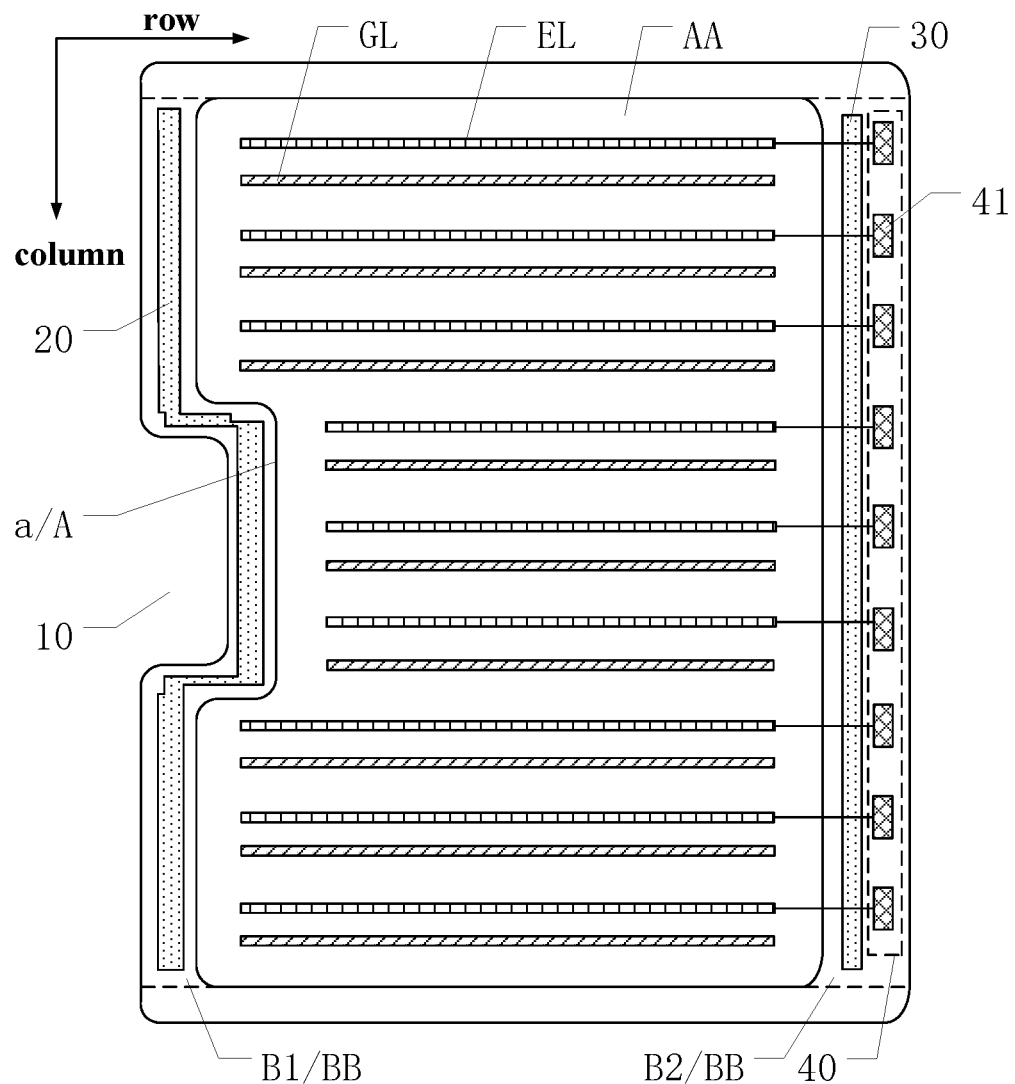
FIG. 1 illustrates a schematic top view of an exemplary display panel consistent with the disclosed embodiments.
Figure 2:
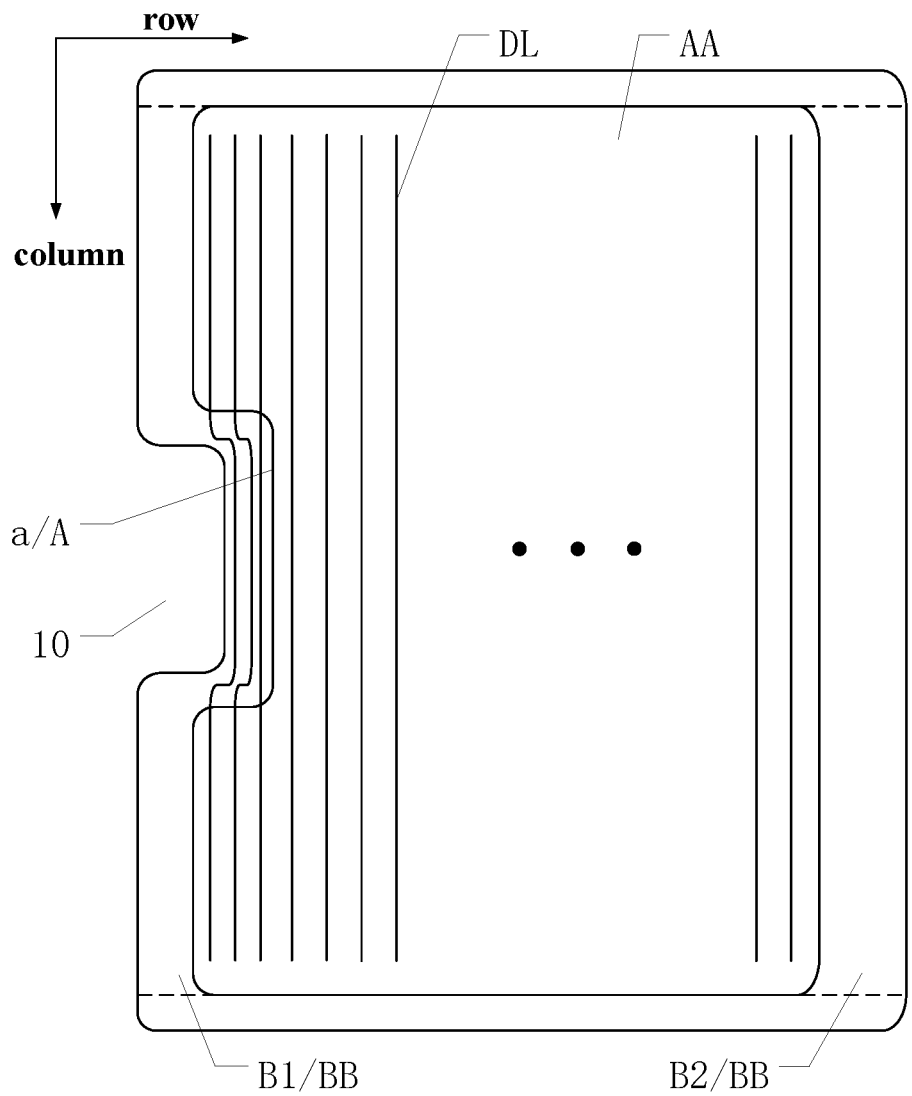
FIG. 2 illustrates a schematic top view of another exemplary display panel consistent with the disclosed embodiments.

The present disclosure provides a display panel. FIG. 1 illustrates a schematic top view of an exemplary display panel consistent with the disclosed embodiments, and FIG. 2 illustrates a schematic top view of another exemplary display panel consistent with the disclosed embodiments. As shown in FIGS. 1-2, the display panel may include a display area AA, a non-display area BB surrounding the display area AA, and at least one notch 10. The display area AA may include a plurality of scanning lines GL, a plurality of light-emitting controlling lines EL and a plurality of data lines DL. The plurality of scanning lines GL and the plurality of light-emitting controlling lines EL may extend in a row direction, and the plurality of data lines DL may extend in a column direction.

The non-display area BB may include a first non-display area B1 and a second non-display area B2, and the first non-display area B1 and the and the second non-display areas B2 may be disposed on opposite sides of the display area AA in the row direction. The display area AA may include an irregular-shaped side A, which may be a common boundary of the display area AA and the first non-display area B1. The irregular-shaped side A may include at least one sub-edge a, which may be recessed towards the inside of the display area AA to form the notch 10.

The display panel may further include a first scanning driving circuit 20, a second scanning driving circuit 30 and a light-emitting controlling circuit 40. The first scanning driving circuit 20 may be disposed at the first non-display area B1, and the second scanning driving circuit 30 and the light-emitting controlling circuit 40 may be both disposed at the second non-display area B2. The light-emitting controlling circuit 40 may include a plurality of cascaded light-emitting controllers 41, and an output terminal of each light-emitting controller 41 may be electrically connected to at least one light-emitting controlling line EL.

In the disclosed embodiments, the display area AA and the first non-display area B1 may have a common boundary of the irregular-shaped side A, and the sub-edge a of the irregular-shaped side A may be recessed toward the inside of the display area AA to form the notch 10. Thus, the area of the notch 10 may be disposed with some functional devices, such as a camera, a speaker, etc., and the display device is effectively improved in terms of functions and visual effects. In practical applications, the number of the sub-edges a and their specific positions at the irregular-shaped edge A may be determined according to various application scenarios on the basis of satisfying the above structural relationship. That is, the number and specific positions of the notches 10 may be determined according to various application scenarios. FIG. 1 and FIG. 2 merely show one notch 10 for illustrative purposes and are not intended to limit the scope of the present disclosure.

Referring to FIG. 2, the plurality of data lines DL may extend in the column direction. However, due to the presence of the notch 10, to provide a data signal to the display panel, a portion of the data lines DL in which the portion is originally passing through the notch 10 may be redirected to pass through the first non-display area B1. As a result, the first non-display area B1 may be disposed with more lines than other areas of the non-display area BB. Because the light-emitting controlling circuit 40 does not occupy any space of the first non-display area B1, the number of lines disposed in the first non-display area B1 may be reduced. Thus, the first non-display area B1 may be allowed to have sufficient space to arrange the portion of the data lines DL in which the portion is redirected to pass through the first non-display area B1, thereby effectively preventing the first non-display area B1 from affecting the display panel due to the excessive line arrangement. Meanwhile, the width of the first non-display area B1 in the row direction may be narrowed, and the screen-to-body ratio may be increased.

Figure 3:
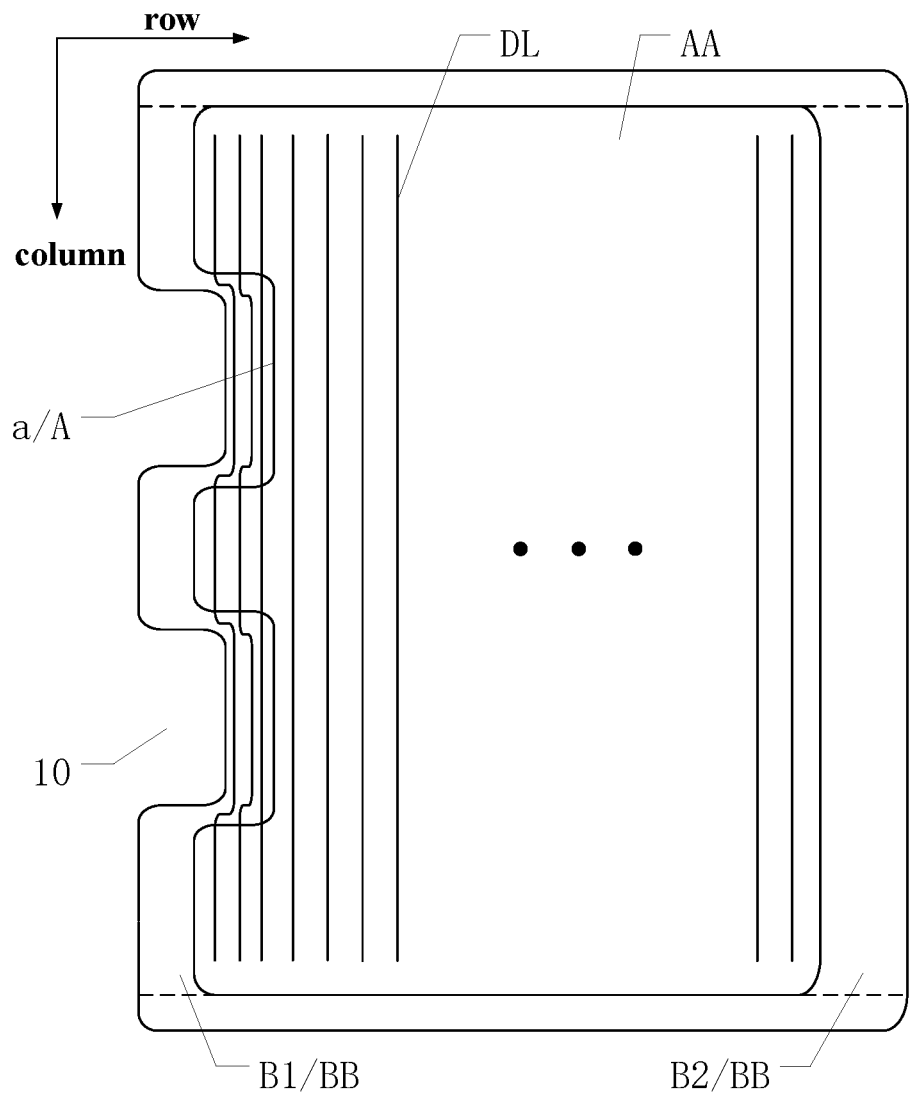
FIG. 3 illustrates a schematic top view of another exemplary display panel consistent with the disclosed embodiments.

In certain embodiments, the display panel may include two or more than two notches, the data line DL may still bypass the notches 10 by being redirected to pass through the first non-display area B1 directly. A corresponding structure is shown in FIG. 3. FIG. 3 illustrates a schematic top view of another exemplary display panel consistent with the disclosed embodiments. The similarities between FIG. 3 and FIG. 2 are not repeated, while certain differences may be explained.

As shown in FIG. 3, the display panel may include two notches 10, the data line DL may still bypass the notches 10 by being redirected to pass through the first non-display area B1 directly. Further, as the number of notches 10 increases, the number of functional devices which are to be installed may increase accordingly to meet the diverse demands of users.

It should be noted that, to more intuitively illustrate the technical solution of the disclosed embodiments, other structures of the display panel are not illustrated in FIG. 1 to FIG. 3. Meanwhile, to better distinguish the scanning lines GL from the light-emitting controlling lines EL, the scanning lines GL and the light-emitting controlling lines EL are filled with different patterns.

In addition, in one embodiment, the notch 10 may be a through-hole penetrating through the entire display panel in the thickness direction of the display panel, in another embodiment, the notch 10 may be a blind hole only penetrating through certain film layers of the display panel. That is, provided that the function of the device such as the camera or the speaker are not degraded, transparent film layers in the display panel may be partially removed or reserved, which are not limited by the present disclosure.

Figure 4:
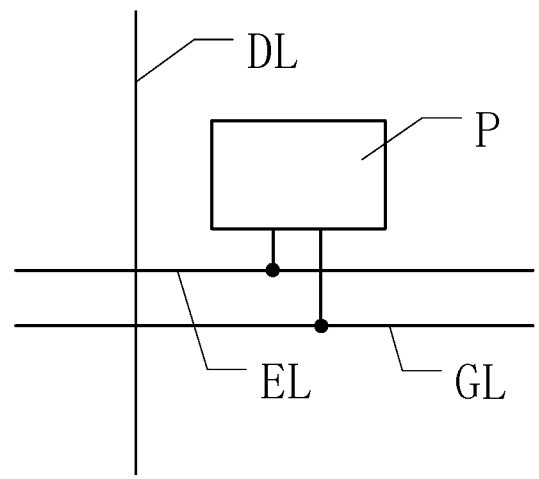
FIG. 4 illustrates a schematic diagram of an exemplary pixel driving structure consistent with the disclosed embodiments.

The display panel may display images based on a plurality of pixels P. FIG. 4 illustrates a schematic diagram of an exemplary pixel driving structure consistent with the disclosed embodiments. Referring to FIG. 1, FIG. 2 and FIG. 4, a pixel P may be disposed in a region defined by the intersection of the data line DL, the scanning line GL and the light-emitting controlling line EL. The data line DL, the scanning line GL and the light-emitting controlling line EL may be insulated from each other. When a first scanning driving circuit 20 and a second scanning driving circuit 30 provide a scanning signal to the scanning line GL, the pixel P electrically connected to the scanning line GL may be selected to receive the data signal from the data line DL, such that the selected pixel P may emit light. The duration of emitting light may be controlled by the light-emitting controlling line EL.

Figure 5:
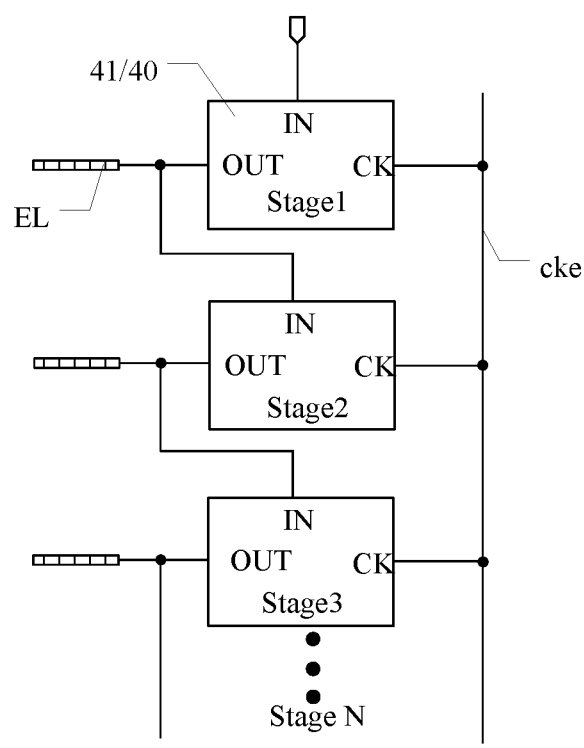
FIG. 5 illustrates an exemplary light-emitting controlling circuit consistent with the disclosed embodiments.

FIG. 5 illustrates an exemplary light-emitting controlling circuit consistent with the disclosed embodiments. As shown in FIG. 5, the light-emitting controlling circuit may include a plurality of light-emitting controllers 41 (i.e., Stage 1, Stage 2, Stage 3 . . . Stage N). An output terminal of each light-emitting controller 41 may be electrically connected to at least one light-emitting controlling line EL, and the plurality of light-emitting controller 41 may be electrically connected in a cascade manner. In particular, an input terminal CK of the light-emitting controller 41 may be configured to receive a clock signal of a clock signal line cke, and an input terminal IN of the first-stage light-emitting controller 41 (i.e., Stage 1) may be configured to receive a start signal.

Starting from the second-stage light-emitting controller 41 (i.e., Stage 2), the input terminal IN of the light-emitting controller 41 may be electrically connected to the output terminal OUT of the light-emitting controller 41 one stage lower, thereby providing light-emitting controlling signals to the light-emitting controlling lines EL stage by stage, as well as, controlling the duration of emitting light. The cascaded connection of the plurality of light-emitting controllers 41 shown in FIG. 5 are for illustrative purposes. In practical applications, the electric connection between the plurality of light-emitting controllers 41 may be determined according to various application scenarios, which are not limited by the present disclosure.

In the disclosed embodiments, through configuring a common boundary of the display area AA and the first non-display area B1 to form a notch in which a camera, a speaker and the like may be installed, the user demands of diversified functions and visual effects may be satisfied. The scanning lines disposed in the display area may be provided with a scanning signal by the first scanning driving circuit disposed in the first non-display area B1 and the second scanning driving circuit disposed in the second non-display area B2. The light-emitting controlling lines may be provided with a light-emitting controlling signal by the light-emitting controlling circuit, which may be also located in the second non-display area as the light-emitting controlling lines, such that the display area may display images normally and, accordingly, the display performance of the display device may be ensured.

Further, the display area AA may have a first side close to the notch and an opposing second side far away from the notch. The second non-display area B2 may be disposed at the second side of the display area, i.e., the light-emitting controlling circuit may not occupy any space of the first non-display area B1. Thus, the number of signal lines in the display area AA may be reduced and, meanwhile, the width of the first non-display area B1 along the row direction may be greatly narrowed, which may improve the screen-to-body ratio and realize the narrow frame of the display device.

Figure 6:
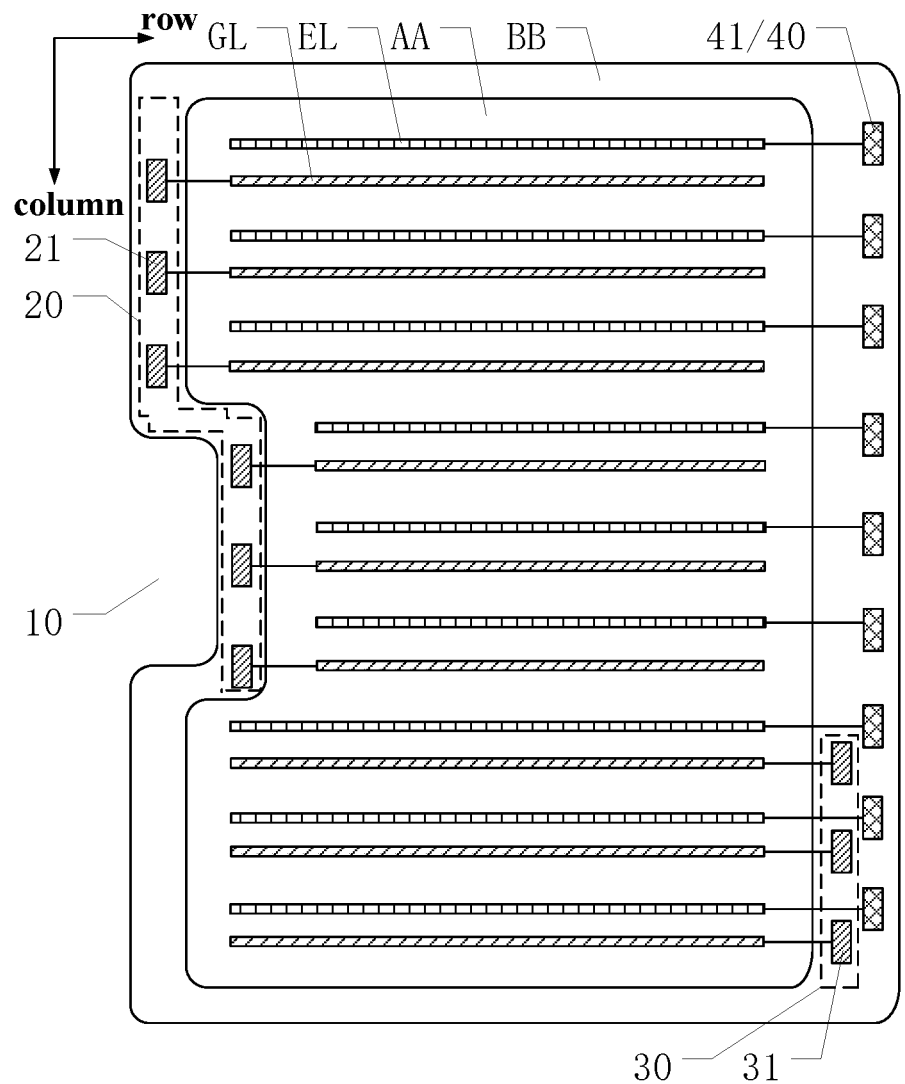
FIG. 6 illustrates a schematic top view of another exemplary display panel consistent with the disclosed embodiments.
Figure 7:
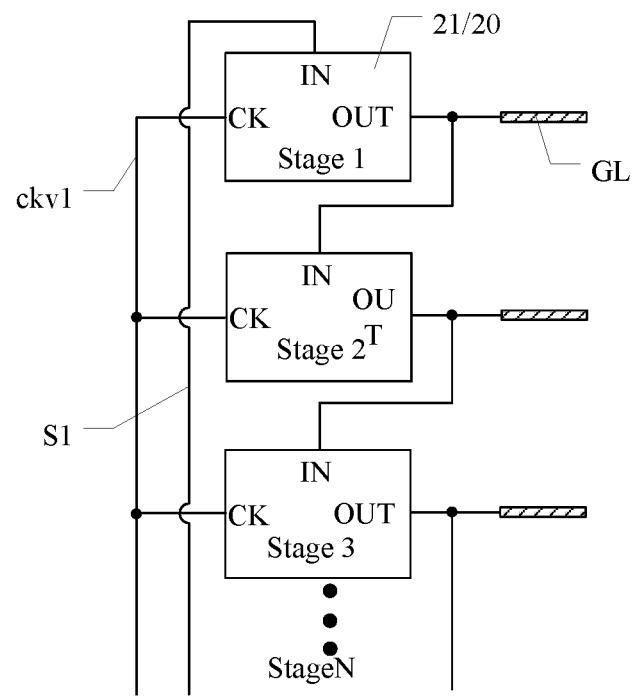
FIG. 7 illustrates an exemplary first scanning driving circuit consistent with the disclosed embodiments.
Figure 8:
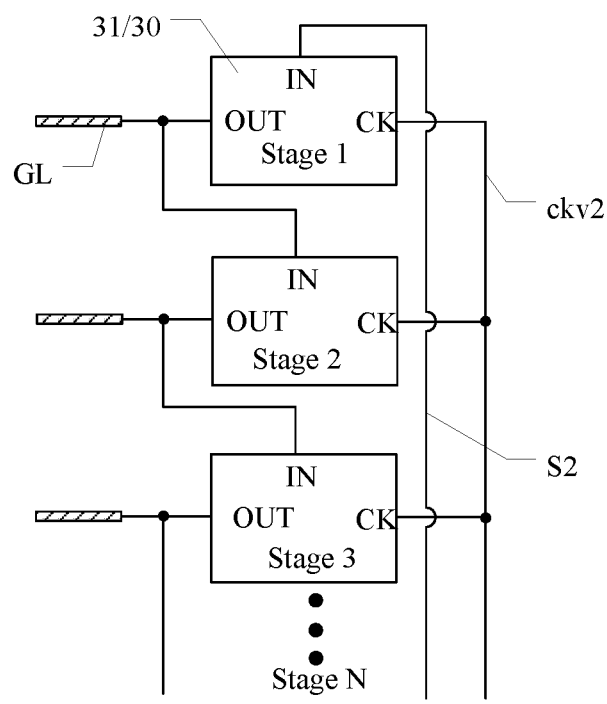
FIG. 8 illustrates an exemplary second scanning driving circuit consistent with the disclosed embodiments.

FIG. 6 illustrates a schematic top view of another exemplary display panel consistent with the disclosed embodiments, FIG. 7 illustrates an exemplary first scanning driving circuit consistent with the disclosed embodiments, and FIG. 8 illustrates an exemplary second scanning driving circuit consistent with the disclosed embodiments.

In certain embodiments, as shown in FIGS. 6-8, the first scanning driving circuit 20 may include a first STV signal line S1 and a plurality of cascaded first scanning drivers 21 (e.g., Stage 1, Stage 2 . . . Stage N). An output terminal OUT of the first scanning driver 21 may be electrically connected to at least one scanning line GL, and an input terminal IN of the first-stage first scanning driver 21 (i.e., Stage 1) may be electrically connected to the first STV signal line S1. The second scan drive circuit 30 may include a second STV signal line S2 and a plurality of cascaded second scanning drivers 31 (e.g., Stage 1, Stage 2 . . . Stage N). An output terminal OUT of the second scanning driver 31 may be electrically connected to at least one scanning line GL, and an input terminal IN of the first-stage second scanning driver 31 (i.e., Stage 1) may be electrically connected to the second STV signal line S2.

Referring to FIG. 7, an input terminal CK of each stage of the first scanning driver 21 may receive the clock signal of a clock signal line ckv1, and the input terminal IN of the first-stage first scanning driver 21 (i.e., Stage 1) may receive a start signal provided by the first STV signal line S1. Then starting from the second-stage first scanning driver 21 (i.e., Stage 2), the input terminal IN of the first scanning driver 21 may be electrically connected to the output terminal OUT of the first scanning driver 21 one stage lower, thereby providing scanning signals for the scanning lines GL stage by stage.

Similarly, referring to FIG. 8, an input terminal CK of each stage of the second scanning driver 31 may receive the clock signal of a clock signal line ckv2, and the input terminal IN of the first-stage second scanning driver 31 (i.e., Stage 1) may receive a start signal provided by the second STV signal line S2. Then starting from the second-stage second scanning driver 31 (i.e., Stage 2), the input terminal IN of the second scanning driver 31 may be electrically connected to the output terminal OUT of the second scanning driver 31 one stage lower, thereby providing scanning signals for the scanning lines GL stage by stage.

It should be noted that, to more clearly illustrate the technical solution provided by the present disclosure, other structures are not illustrated in FIG. 6. In addition, the number and positions of the first scanning driver 21 and the second scanning driver 31 in FIG. 6 may be determined according to various application scenarios, which is not limited by the present disclosure, as long as each scanning signal line GL is provided with a scanning signal by at least one of the first scanning driver 21 and the second scanning driver 31.

Figure 9:
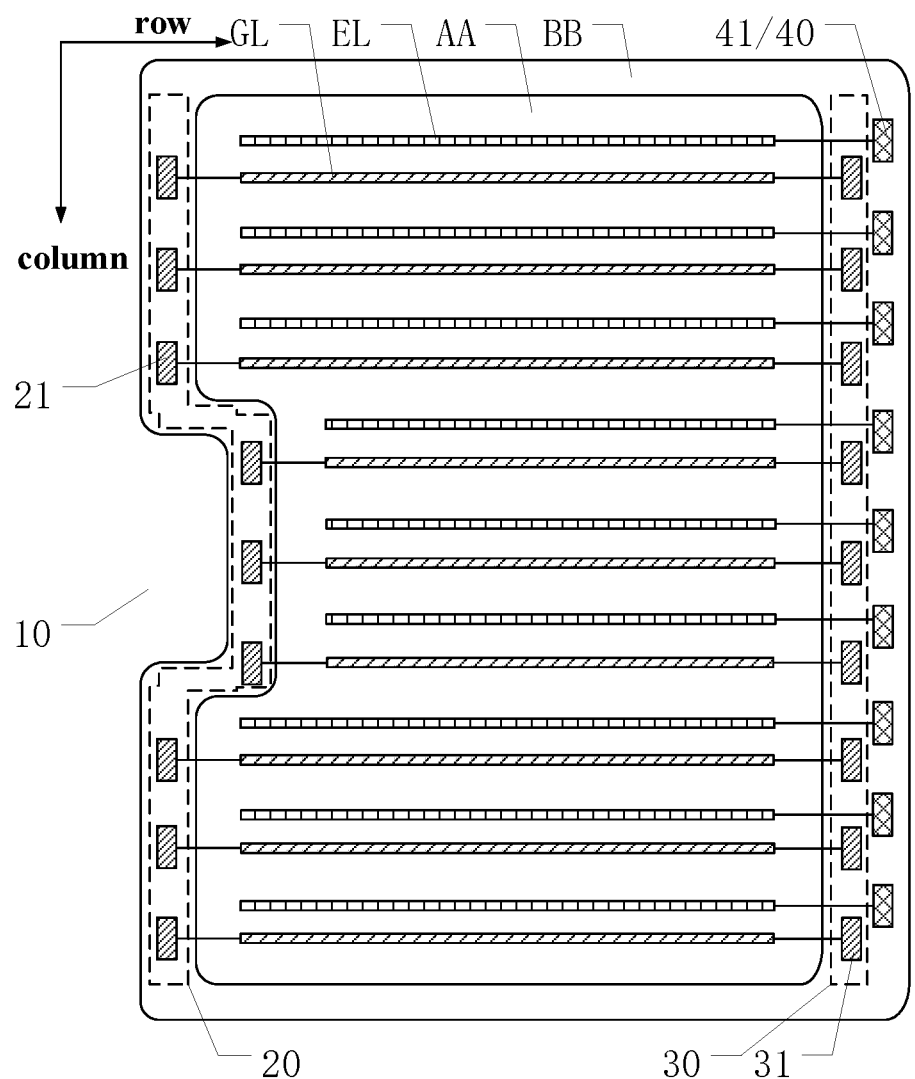
FIG. 9 illustrates a schematic top view of another exemplary display panel consistent with the disclosed embodiments.

FIG. 9 illustrates a schematic top view of another exemplary display panel consistent with the disclosed embodiments. As shown in FIG. 9, each scanning line GL may have one end electrically connected to the output terminal of the first scanning driver 21 and another end electrically connected to the output terminal of the second scanning driver 31. Thus, each scanning lines GL may be driven by the first scanning driver 21 and the second scanning driver 31 in a dual-side driving manner. Referring to FIG. 4 and FIG. 9, because the scanning signal is input at both ends of each scanning line GL, the scanning signal delay among the pixels P in the same row may be effectively reduced, and the display uniformity of the display panel may be improved, realizing a widescreen display.

Figure 10:
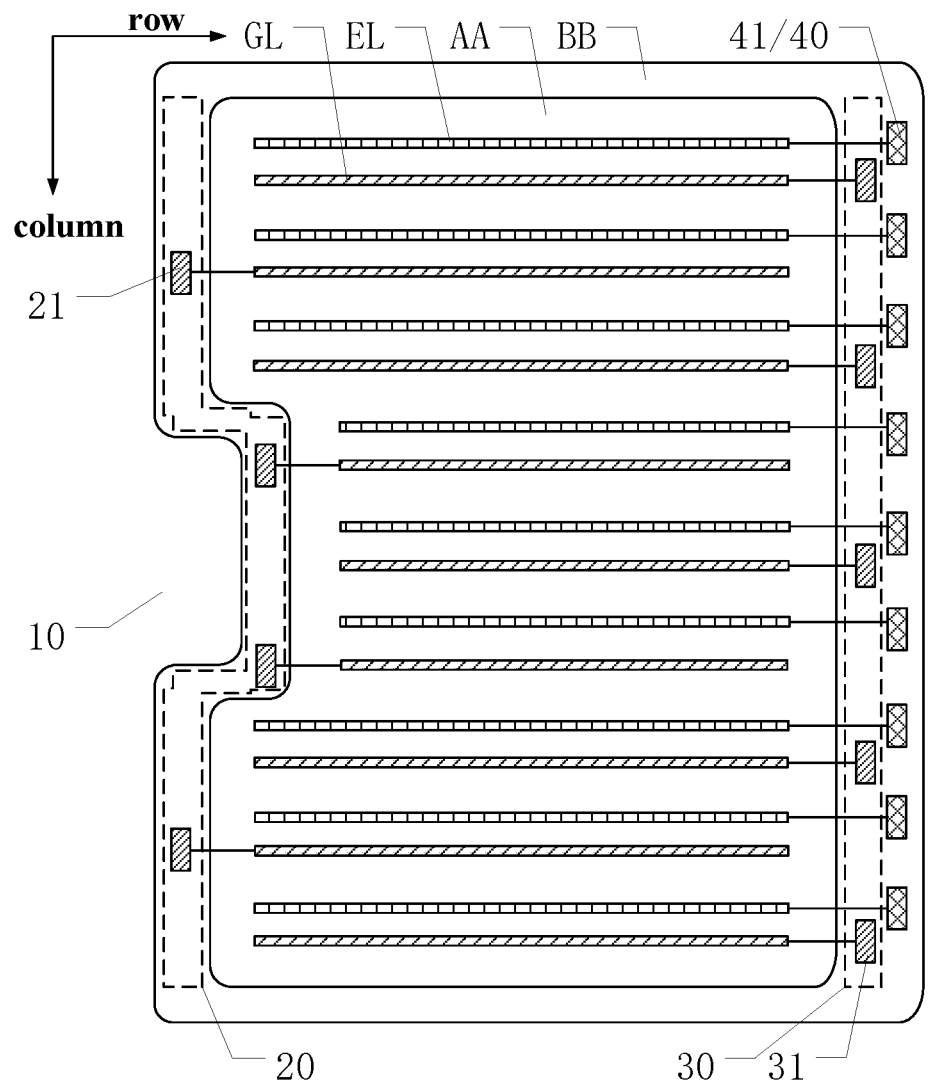
FIG. 10 illustrates a schematic top view of another exemplary display panel consistent with the disclosed embodiments.

FIG. 10 illustrates a schematic top view of another exemplary display panel consistent with the disclosed embodiments. In one embodiment, the output terminals of the first scanning drivers 21 may be electrically connected to the odd-numbered scanning lines GL, and the output terminals of the second scanning drivers 31 may be electrically connected to the even-numbered scanning lines GL. In another embodiment, the output terminals of the first scanning drivers 21 may be electrically connected to the even-numbered scanning lines GL, and the output terminals of the second scanning drivers 31 may be electrically connected to the odd-numbered scanning lines GL. Thus, the scanning lines GL may be driven by the first scanning driver 21 and the second scanning driver 31 in a dual-side and cross-driving manner.

FIG. 10 merely illustrates an exemplary dual-side and cross-driving of the scanning lines GL. As shown in FIG. 10, the output terminals of the first scanning drivers 21 may be electrically connected to the even-numbered scanning lines GL, and the output terminals of the second scanning drivers 31 may be electrically connected to the odd-numbered scanning lines GL. Further, the first scanning drivers 21 may be cascaded connected in a manner shown in FIG. 7, and the second scanning drivers 31 may be cascaded connected in a manner shown in FIG. 8. Because the number of the first scanning driver 21 and the second scanning driver 31 is substantially small, the non-display area BB may allow more space to be disposed with other lines and, meanwhile, it may be easier to realize narrow frame of the display panel.

Figure 11:
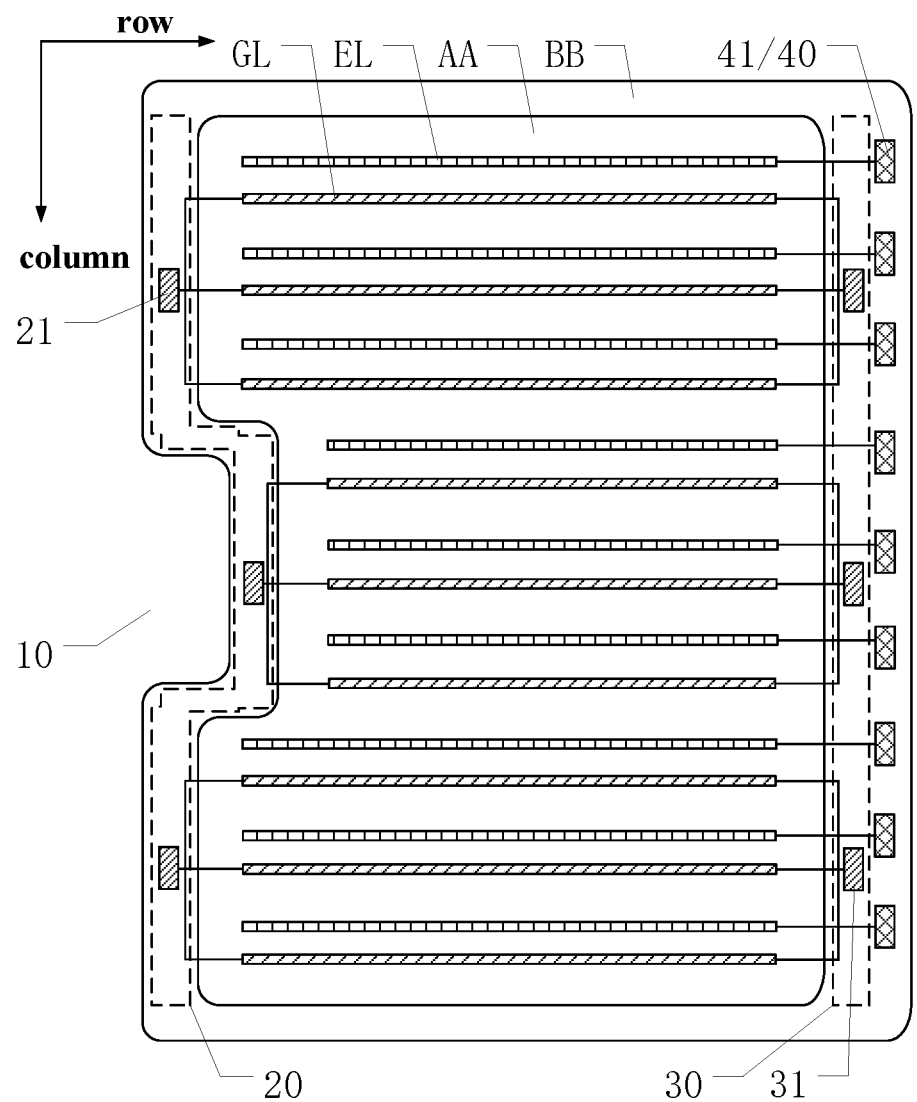
FIG. 11 illustrates a schematic top view of another exemplary display panel consistent with the disclosed embodiments.

FIG. 11 illustrates a schematic top view of another exemplary display panel consistent with the disclosed embodiments. In certain embodiments, the output terminal of each first scanning driver 21 may be electrically connected to at least two scanning lines GL, and the output terminal of each second scanning driver 31 may be electrically connected to at least two scanning lines GL. The number of the scanning lines GL connected to each first scanning driver 21 may be the same or different, and/or the number of scanning lines GL electrically connected to each second scanning driver 31 may be the same or different. In one embodiment, as shown in FIG. 11, the output terminals of each first scanning driver 21 and each second scanning driver 31 may be electrically connected to three scanning lines GL.

Because the first scanning driver 21 and the second scanning driver 31 are able to provide scanning signals to at least two scanning lines GL, the number of scanning drivers used to drive the scanning lines GL may be greatly reduced. That is, in the non-display area, the area occupied by the scanning drivers may be reduced, which may allow the lines in the non-display area BB to be more flexibly arranged. Meanwhile, the first scanning driver 21 and the second scanning driver 31 may also drive the scanning line GL in a dual-side driving manner, which may realize a widescreen display and provide a diverse viewing experience to the user.

Figure 12:
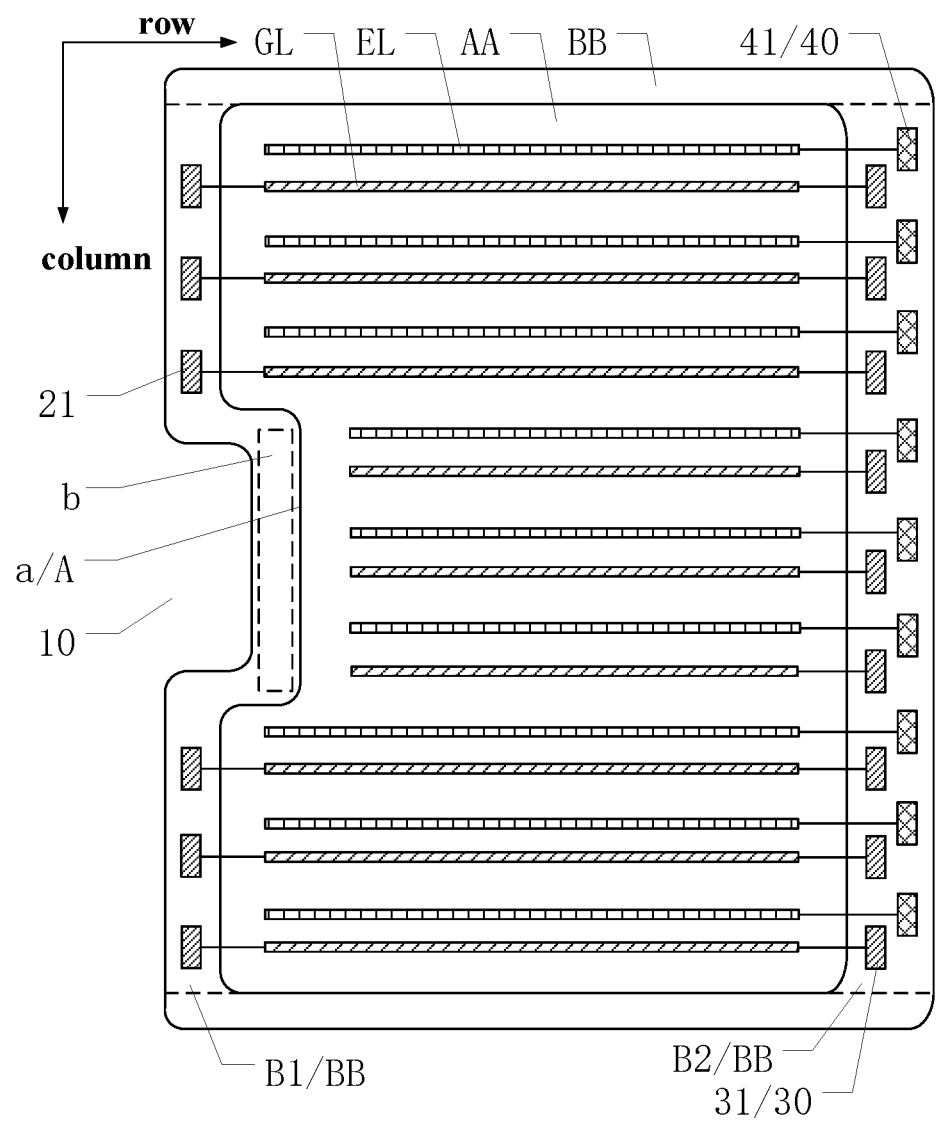
FIG. 12 illustrates a schematic top view of another exemplary display panel consistent with the disclosed embodiments.
Figure 13:
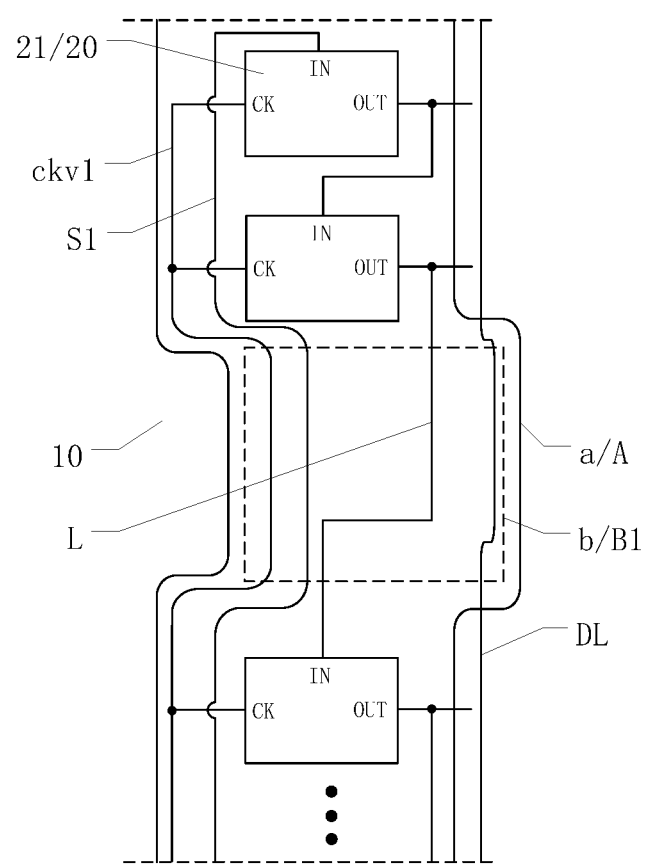
FIG. 13 illustrates a partially enlarged schematic view of FIG. 12.

FIG. 12 illustrates a schematic top view of another exemplary display panel consistent with the disclosed embodiments, and FIG. 13 illustrates a partially enlarged schematic view of FIG. 12. Referring to FIG. 2, FIG. 12 and FIG. 13, the first non-display area B1 may include a first sub-area b which is adjacent to the sub-edge a. In the first non-display area B1, the plurality of cascaded first scanning drivers 21 may be disposed in an area other than the first sub-area b. Through configuring the first sub-area b to be adjacent to the sub-edge a, a portion of the data lines DL may be redirected to pass through the first sub-area b. Meanwhile, in the first non-display area B1, the plurality of cascaded first scanning drivers 21 may be disposed in an area other than the first sub-area b. That is, the position of the first scanning drivers 21 may not affect the arrangement of the portion of the data lines DL. The clock signal line ckv1, the first STV signal line S1, as well as, a connection line L between the first scanning drivers 21 located on two sides of the first sub-area b in the column direction, may be redirected to pass through the first sub-area b. Because the first scanning drivers 21 does not occupy any space in the first sub-area b, a coupling effect between the lines caused by substantially dense line arrangement in the first sub-area b may be suppressed, thereby ensuring the normal display of the display panel.

However, when the width of the first sub-region b in the column direction is substantially large, the first scanning drivers 21 disposed on two sides of the first sub-region b in the column direction may likely to have a signal delay. In one embodiment, the signal delay may be reduced by increasing the width of the signal lines to reduce the voltage drop, thereby ensuring the display uniformity of the display panel.

It should be noted that, the connection manners of the plurality of second scanning drivers 31 may be determined according to various application scenarios, which is not limited by the present disclosure. For example, the second scanning drivers 31 may be cascaded connected as shown in FIG. 8.

Figure 14:
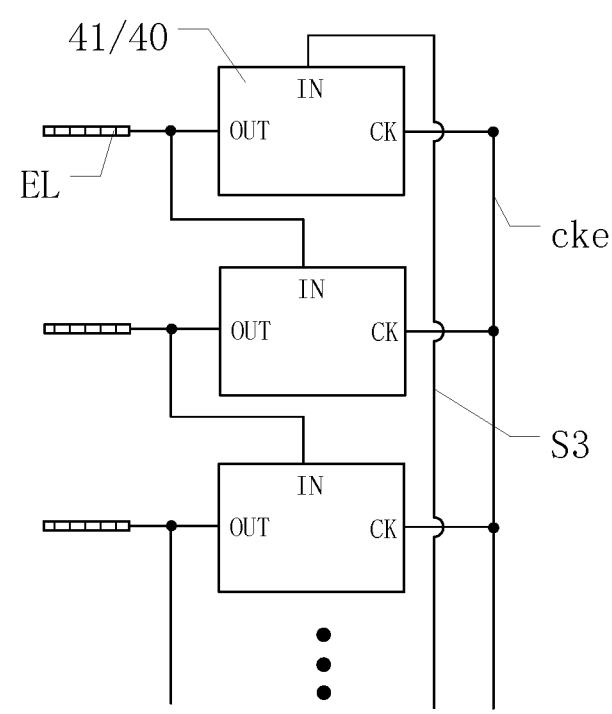
FIG. 14 illustrates a schematic diagram of another exemplary light-emitting controlling circuit consistent with the disclosed embodiments.

FIG. 14 illustrates a schematic diagram of another exemplary light-emitting controlling circuit consistent with the disclosed embodiments. Referring to FIG. 12 and FIG. 14, the light-emitting controlling circuit 40 may further include a third STV signal line S3, and an input terminal of the first-stage light-emitting controller 41 may be electrically connected to the third STV signal line S3. In the disclosed embodiments, a start signal may be provided to the input terminal IN of the first-stage light-emitting controller 41 by the third STV signal line S3, and the third STV signal line S3 may have the same STV signal as the first STV signal line S1 in FIG. 7 and the second STV signal line S2 in FIG. 8. Thus, the first-stage light-emitting controller 41, the first-stage first scanning driver 21 in the first scanning driving circuit 20, and the first-stage second scanning driving circuit 31 in the second scanning driving circuit 30 may be provided with the same start signal and, accordingly, the circuit design may be simplified.

The electric connection among the plurality of light-emitting controllers 41 and the electric connection between the light-emitting controllers 41 and the clock signal lines cke may be referred to FIG. 5, and details are not described herein again.

Figure 15:
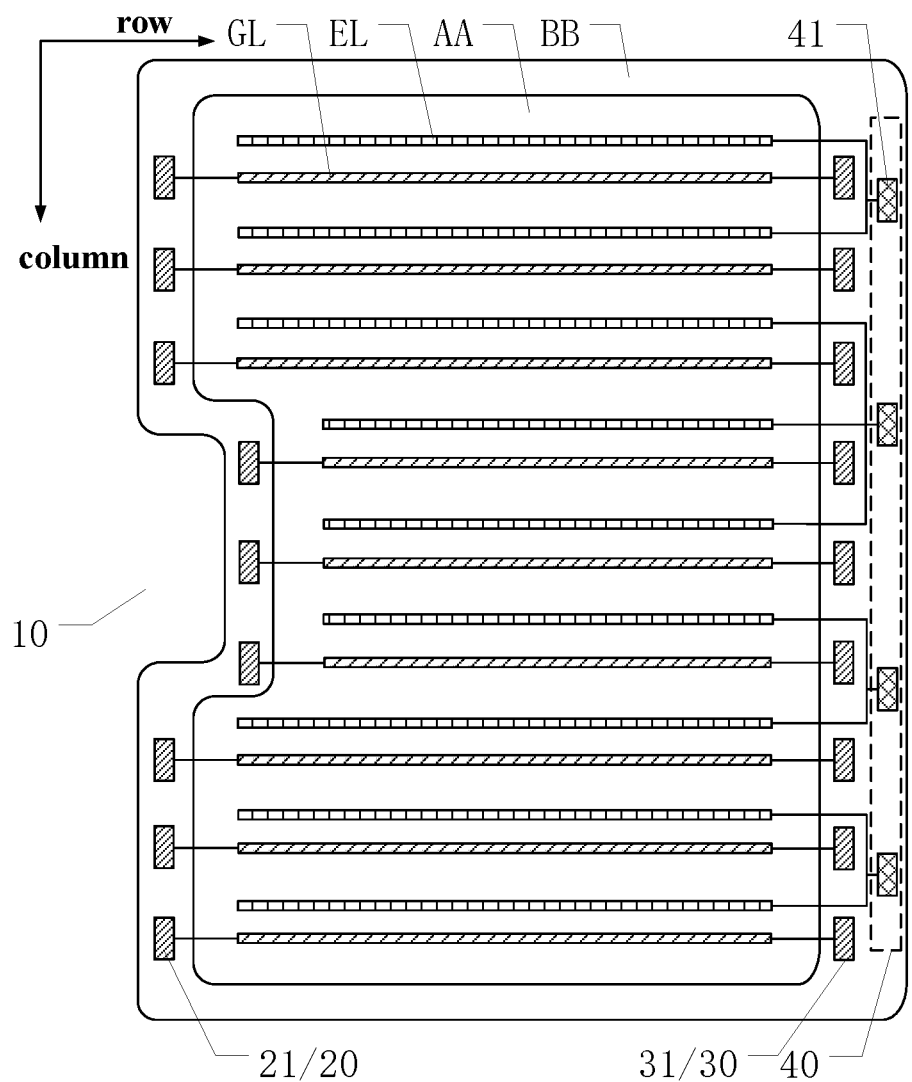
FIG. 15 illustrates a schematic top view of another exemplary display panel consistent with the disclosed embodiments.

In certain embodiments, the output terminal of each light-emitting controller 41 may be electrically connected to two or more light-emitting controlling lines EL, and the output terminal of each light-emitting controller 41 may be electrically connected to different or the same number of light-emitting controlling lines EL, which is not limited by the present discourse. An exemplary structure is shown in FIG. 15. FIG. 15 illustrates a schematic top view of another exemplary display panel consistent with the disclosed embodiments. As shown in FIG. 15, the output terminals of some light-emitting controllers 41 may be electrically connected to two light-emitting controlling lines EL, and the output terminals of the remaining light-emitting controllers 41 may be electrically connected to three light-emitting controlling lines EL. The structure shown in FIG. 15 is for illustrative purposes and is not intended to limit the scope of the present discourse.

Because the light-emitting controller 41 may provide light-emitting controlling signals to at least two light-emitting controlling lines EL, the number of light-emitting controllers 41 used to drive the light-emitting controlling lines EL may be reduced. That is, in the non-display area BB, the space occupied by the light-emitting controllers 41 may be reduced, and the lines may be more flexibly arranged in the non-display area BB.

Figure 16:
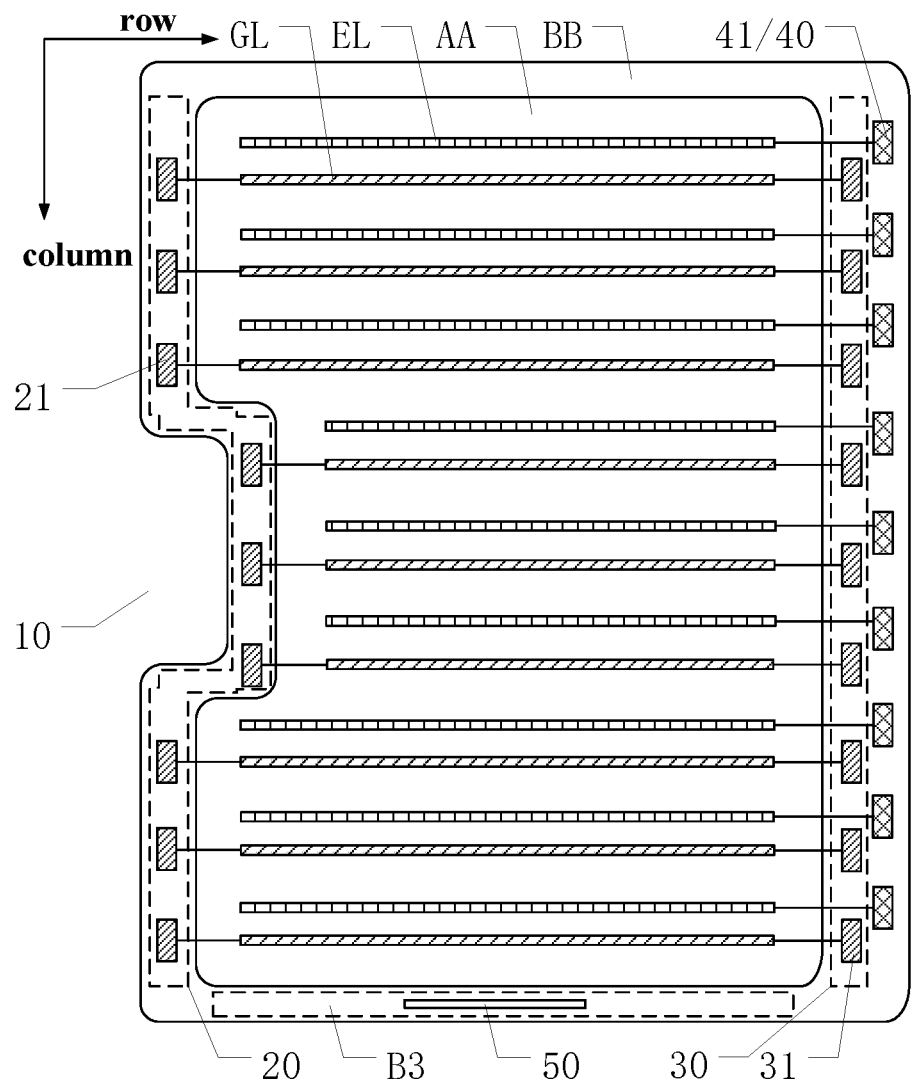
FIG. 16 illustrates a schematic top view of another exemplary display panel consistent with the disclosed embodiments.
Figure 17:
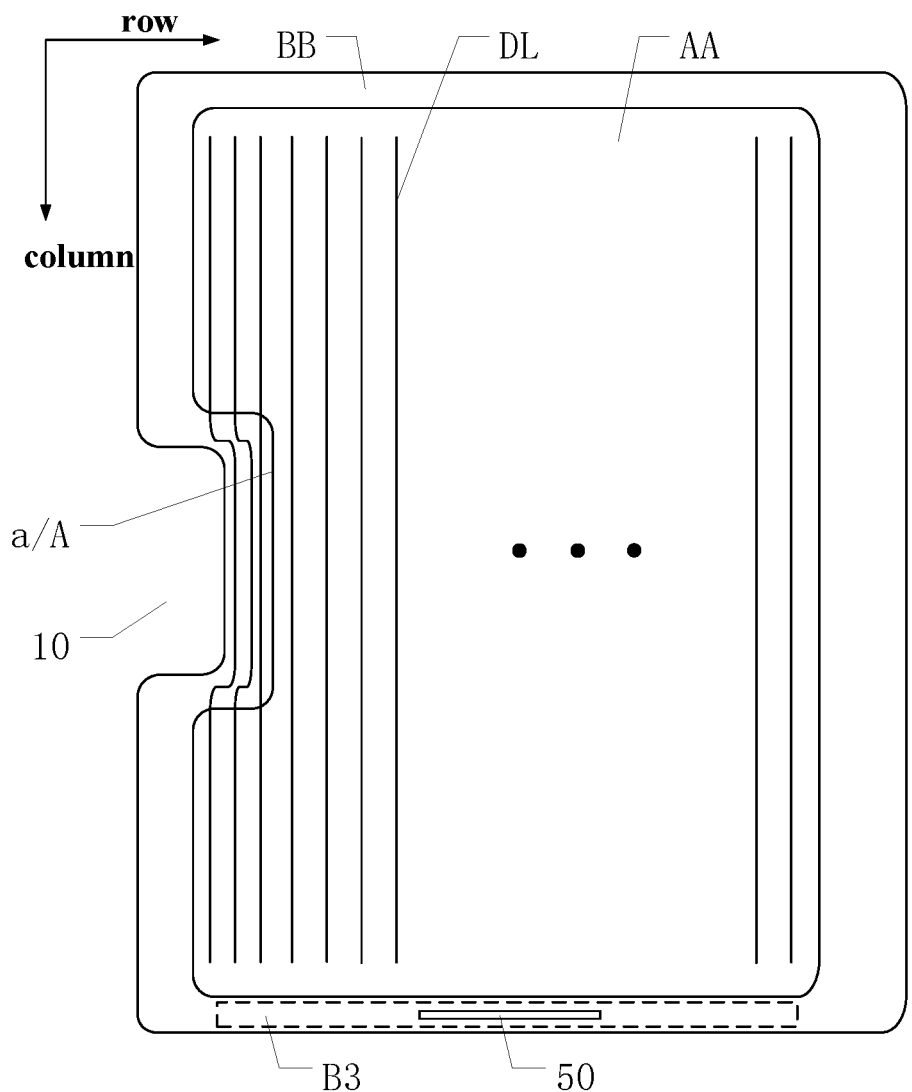
FIG. 17 illustrates a schematic top view of another exemplary display panel consistent with the disclosed embodiments.
Figure 18:
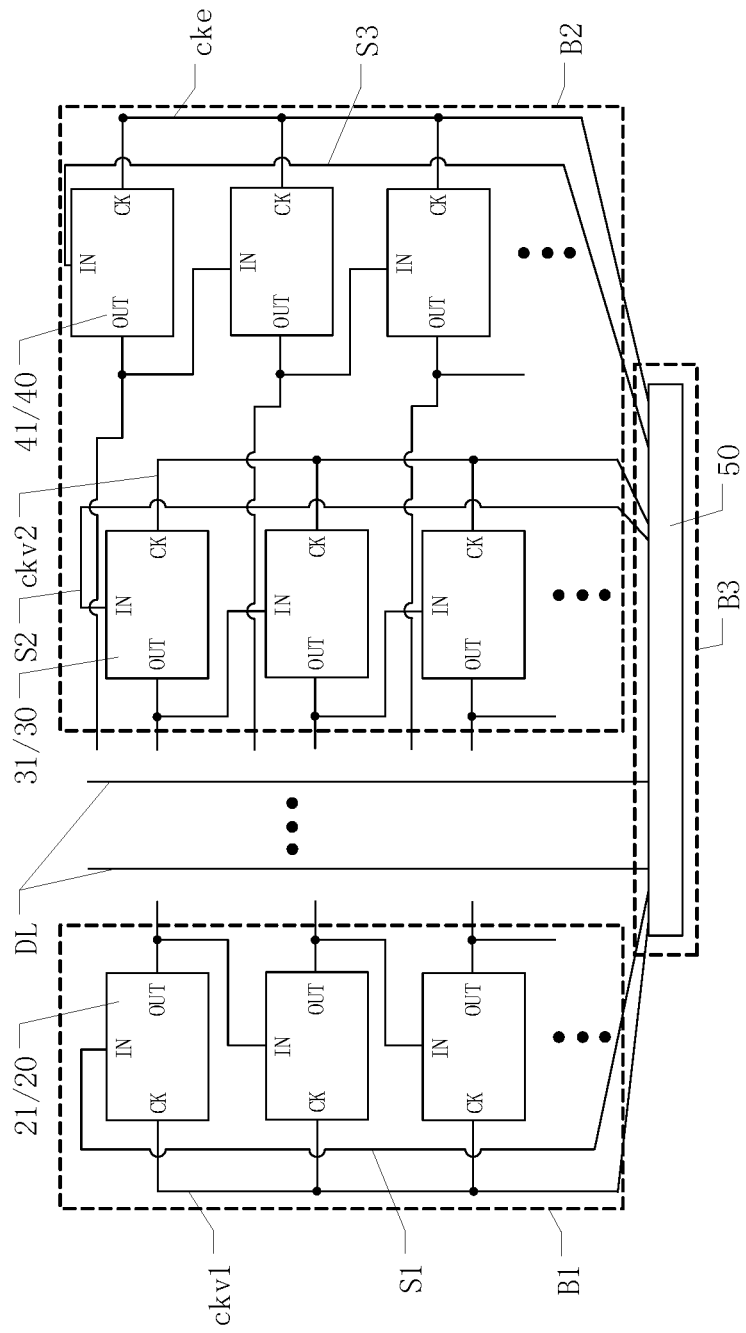
FIG. 18 illustrates an exemplary wiring layout consistent with the disclosed embodiments.

FIG. 16 illustrates a schematic top view of another exemplary display panel consistent with the disclosed embodiments, FIG. 17 illustrates a schematic top view of another exemplary display panel consistent with the disclosed embodiments, and FIG. 18 illustrates an exemplary wiring layout consistent with the disclosed embodiments.

As shown in FIGS. 16-18, the non-display area BB may further include a third non-display area B3 in addition to the first non-display area B1 and the second non-display area B2. The third non-display area B3 and the display area AA may be arranged in the column direction. The non-display area B3 may include at least one driving unit 50, which may be electrically connected to the first scanning driving circuit 20, the second scanning driving circuit 30, the light-emitting controlling circuit 40, and the data lines DL.

In particular, the third non-display area B3 and the display area AA may be arranged in the column direction. In the display area AA, the data line DL may have a first end close to the driving unit 50 and an opposing second end far away from the driving unit 50, and the first end of each data line DL may be directly electrically connected to the driving unit 50. Thus, the arrangement of data lines DL may be simplified, and the load difference between the data lines DL may be reduced, and the display uniformity of the display panel may be enhanced.

Further, the first STV signal line S1 and the clock signal line ckv1 in the first scanning driving circuit 20, the second STV signal line S2 and the clock signal line ckv2 in the second scanning driving circuit 30, and the third STV signal line S3 and the clock signal line cke in the light-emitting controlling circuit 40 may be electrically connected to the driving unit 50, thereby being provided with corresponding driving signals through the driving unit 50 and reducing the difficulty in arranging these signal lines in the non-display area BB. In certain embodiments, the first STV signal line S1 and the clock signal line ckv1 in the first scanning driving circuit 20, the second STV signal line S2 and the clock signal line ckv2 in the second scanning driving circuit 30, and the third STV signal line S3 and the clock signal line cke in the light-emitting controlling circuit 40 may be provided with driving signals through other driving devices, which is not limited by the present disclosure.

It should be noted that, to more clearly illustrate the technical solution provided by the present disclosure, other structures are not illustrated in FIGS. 16-17. Further, the number of the driving units 50 may be one, or two or more, which is not limited by the present disclosure. FIGS. 16-18 merely shows one driving unit 50 for illustrative purposes and is not intended to limit the scope of the present disclosure.

Referring to FIG. 18, the driving unit 50 may be an IC (Integrated Circuit) driving chip. In particular, the IC driving chip integrates a large number of circuits formed by microelectronic components such as transistors and capacitors on a small semiconductor wafer or a dielectric substrate, which is then encapsulated in a single package. By binding the IC driving chip to the display panel, the circuits electrically connected to the IC driving chip may be driven, which may improve the efficiency of the line arrangement. Moreover, because the IC driving chip has a substantially small size, through configuring the driving unit 50 to be the IC driving chip, the width of the third non-display area B3 in the column direction may be further reduced and, accordingly, the screen-to-body ratio of the display panel may be further increased.

Figure 19:
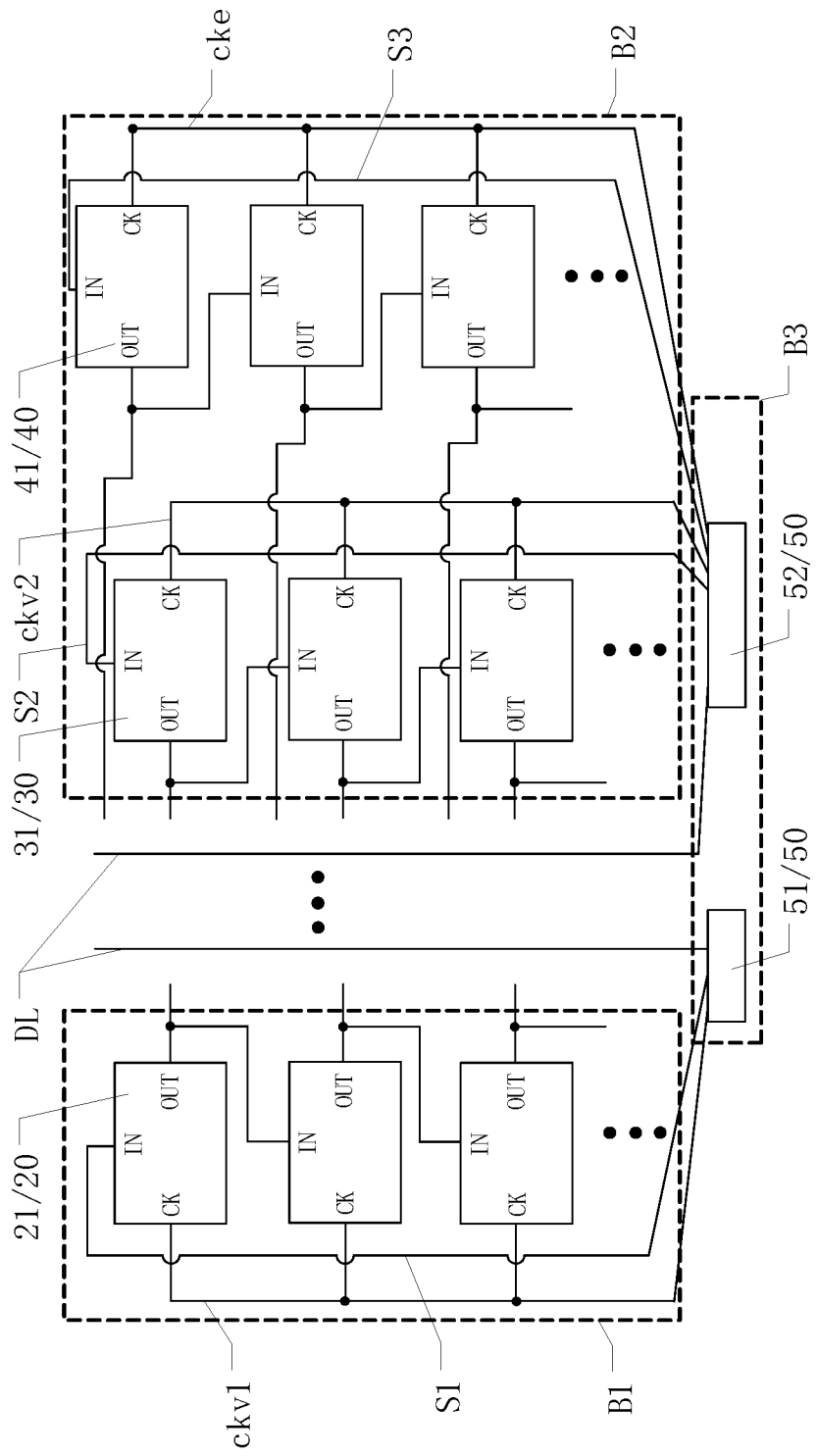
FIG. 19 illustrates another exemplary wiring layout consistent with the disclosed embodiments.

FIG. 19 illustrates another exemplary wiring layout consistent with the disclosed embodiments. As shown in FIG. 19, the non-display area B3 may include two driving units 50: a first driving unit 51 and a second driving unit 52. The first driving unit 51 may be electrically connected to the first scanning driving circuit 20 and at least one data line DL, and the second driving unit 52 may be electrically connected to the second scanning driving circuit 30, the light-emitting controlling circuit 40, and the remaining data lines DL (i.e., the date lines which are not electrically connected to the first driving unit 51).

The first driving unit 51 and the second driving unit 52 are relative. In one embodiment, to reduce the difficulty of the wire arrangement, one driving unit 50 close to the first scanning driving circuit 20 may be configured as the first driving unit 51, and the other driving unit may be configured as the second driving unit 52. Thus, the first driving unit 51 may provide driving signal to the first STV signal line S1 and the clock signal line ckv1 in the first scanning driving circuit 20, and at least one data line DL. The second driving unit 52 may provide driving signal to the second STV signal line S2 and the clock signal line ckv2 in the second scanning driving circuit 30, the third STV signal line S3 and the clock signal line cke in the light-emitting controlling circuit 40, and the remaining data lines DL. Thus, the load difference among the signal lines may be further reduced, and the display uniformity of the display panel may be further enhanced.

Figure 20:
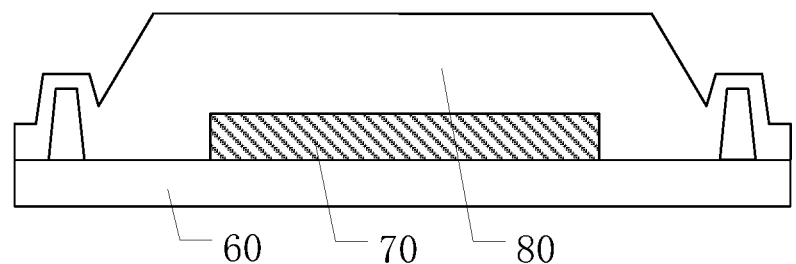
FIG. 20 illustrates a schematic cross-sectional view of an exemplary display panel consistent with the disclosed embodiments.

FIG. 20 illustrates a schematic cross-sectional view of an exemplary display panel consistent with the disclosed embodiments. In certain embodiments, as shown in FIG. 1 and FIG. 20, the display panel may be a flexible display panel having enhanced deformable and bendable performance, thereby providing diverse user experience. It should be noted that, to more clearly illustrate the technical solution provided by the present disclosure, FIG. 20 simply illustrates the structure of main film layers.

The flexible display panel may include a flexible substrate 60, and a light-emitting layer 70 and an encapsulation layer 80 sequentially disposed on the flexible substrate 60. The flexible substrate 60 may be made of transparent, translucent, or opaque flexible materials, for example, a polymer material such as polyimide or polycarbonate. The light-emitting layer 70 may be a structure in the display area AA in any one of the disclosed embodiments. The encapsulation layer 80 may generally include alternately arranged organic layers and inorganic layers, in which the inorganic layer may cover the light-emitting layer 70 and the non-display area BB to block the moisture and oxygen, while the organic layer may only cover the display area AA for planarization.

Figure 21:
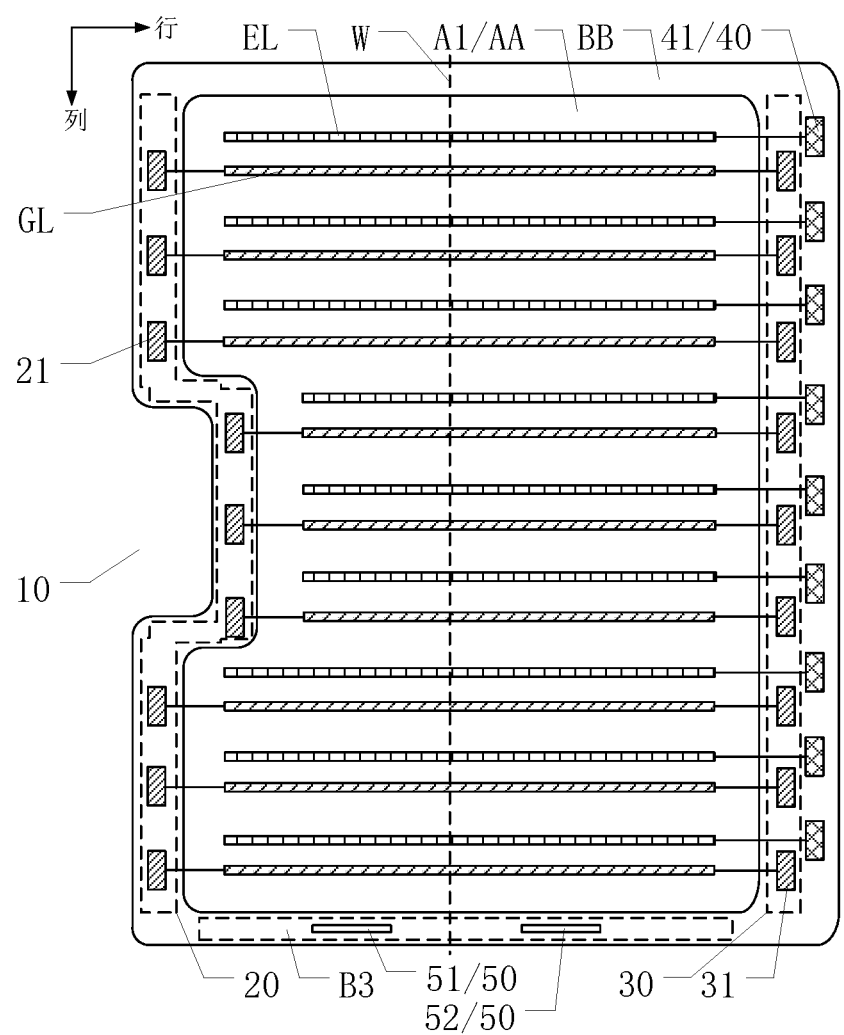
FIG. 21 illustrates a schematic cross-sectional view of another exemplary display panel consistent with the disclosed embodiments.
Figure 22:
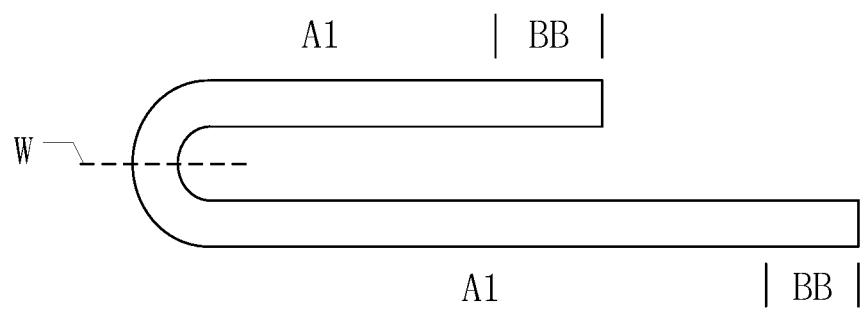
FIG. 22 illustrates a bent state of another exemplary display panel in FIG. 21 consistent with the disclosed embodiments.

FIG. 21 illustrates a schematic cross-sectional view of another exemplary display panel consistent with the disclosed embodiments, and FIG. 22 illustrates a bent state of another exemplary display panel in FIG. 21 consistent with the disclosed embodiments. As shown in FIG. 21 and FIG. 22, the display area AA may include at least two sub-display areas A1 which are arranged in a row direction. The display panel may have a flat/planar state and a bent state. In the flat state, the at least two sub-display areas A1 may be disposed on the same plane. In the bent state, the at least two sub-display areas A1 may at least partially overlap in a direction perpendicular to the display panel.

In one embodiment, referring to FIG. 21, the display area AA may be divided into at least two sub-display areas A1 by at least one bending axis W extending in the column direction, and the at least two sub-display areas A1 may be arranged in the row direction. In another embodiment, the bending axis W may also extend in the row direction or in another direction, which is not limited by the present disclosure.

In the flat state, i.e., the display panel may not be bent along the bending axis, and the sub-display areas A1 may be all located on the same plane, the display panel may display a largest picture, providing an enhanced visual effect to the user. The width of each sub-display area A1 in the row direction may be the same, or different, or partially the same, which is not limited by the present disclosure.

Referring to FIG. 22, in the bent state, the at least two sub-display areas A1 may at least partially overlap in a direction perpendicular to the display panel, simplifying the store and carry of the display device. In one embodiment, as shown in FIG. 22, the display area AA may include two sub-display areas A1. When the widths of the two sub-display areas A1 are different in the row direction, after the display panel is bent along the bending axis W, the two sub-display areas A1 may not completely overlap with each other in the direction perpendicular to the display panel. When the widths of the two sub-display areas A1 are the same in the row direction, after the display panel is bent along the bending axis W, the two sub-display areas A1 may completely overlap with each other in the direction perpendicular to the display panel, however, the non-display areas BB located on two sides of the display area AA may not completely overlap with each other.

In one embodiment, referring to FIG. 21, two driving units 50 may be disposed in the third non-display area B3, and the two driving units 50 may be disposed at two sides of the bending axis W. One driving unit 50 arranged close to the first scanning driving circuit 20 may be configured as the first driving unit 51, and the other driving unit 50 may be configured as the second driving unit 52. The specific wiring layout may refer to FIG. 19. Because the first driving unit 51 and the second driving unit 52 are disposed at two sides of the bending axis W, when the display panel is bent, the influence on the connecting lines between the two driving units 50 may be substantially small, and the occurrence of breakage and damage to the drive unit 50 may be suppressed. Accordingly, the reliability of the display panel and the display uniformity may be enhanced.

Figure 23:
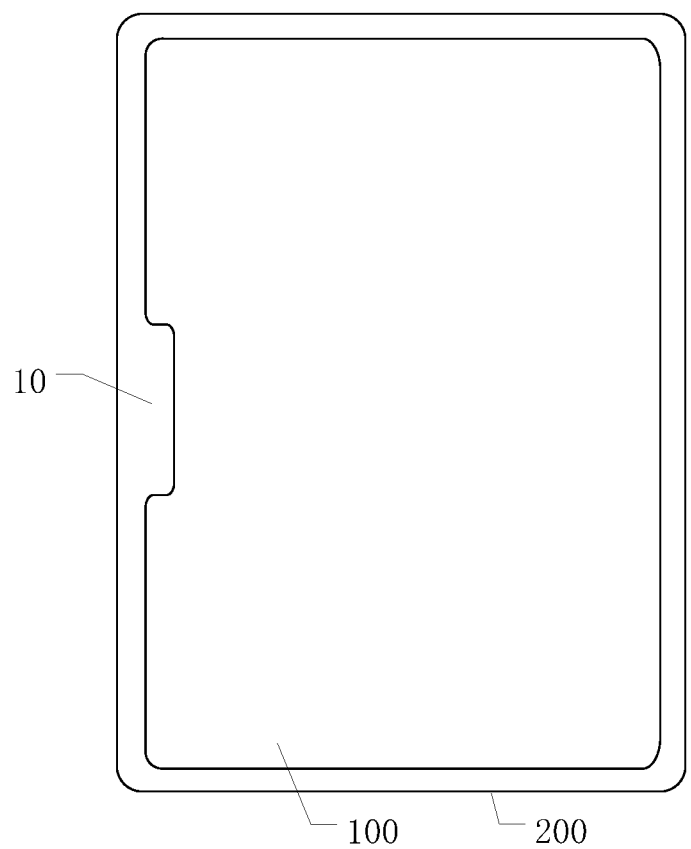
FIG. 23 illustrates a schematic view of an exemplary display device consistent with the disclosed embodiments.

The present disclosure also provides a display device comprising the disclosed display panel. FIG. 23 illustrates a schematic view of an exemplary display device 200 consistent with the disclosed embodiments. As shown in FIG. 23, the display device 200 may include a display panel 100, which is any one of the disclosed display panels. FIG. 23 illustrates the display device 200 may be a tablet computer. The display device 200 may also be a display device having a display function, such as a mobile phone, a television, a vehicle display, etc., which is not limited by the present disclosure. Because the disclosed display device includes any one of the disclosed display panels, the disclosed display device may also have the same features as the disclosed display panel, and details are not described herein again.

Figure 24:
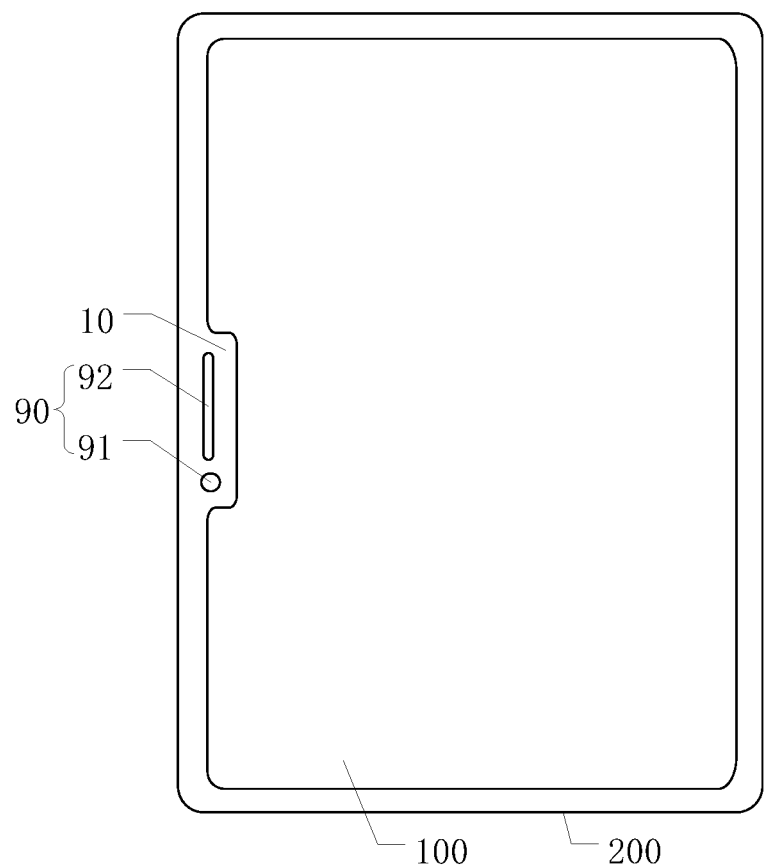
FIG. 24 illustrates a schematic view of another exemplary display device consistent with the disclosed embodiments.

FIG. 24 illustrates a schematic view of another exemplary display device 200 consistent with the disclosed embodiments. As shown in FIG. 24, the display device may further include at least one photosensitive device 91 disposed in a notch 10. In one embodiment, the photosensitive device 91 may be a device having an optical function such as a camera. To meet the diversified demands of the users, a device such as an earpiece 92 may be disposed in the notch 10, thereby facilitating the user to answer the call.

In the disclosed embodiments, through configuring a common boundary of the display area and the first non-display area to form a notch in which a camera, a speaker and the like may be installed, the user demands of diversified functions and visual effects may be satisfied. The scanning lines disposed in the display area may be provided with a scanning signal by the first scanning driving circuit disposed in the first non-display area and the second scanning driving circuit disposed in the second non-display area. The light-emitting controlling lines may be provided with a light-emitting controlling signal by the light-emitting controlling circuit, which may be also located in the second non-display area as the light-emitting controlling lines, such that the display area may display images normally and, accordingly, the display performance of the display device may be ensured.

Further, the display area may have a first side close to the notch and an opposing second side far away from the notch. The second non-display area may be disposed at the second side of the display area, i.e., the light-emitting controlling circuit may not occupy any space of the first non-display area. Thus, the number of signal lines in the display area may be reduced and, meanwhile, the width of the first non-display area along the row direction may be greatly narrowed, which may improve the screen-to-body ratio and realize the narrow frame of the display device.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure.

Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display panel, comprising:
a display area including a plurality of scanning lines, a plurality of light-emitting controlling lines and a plurality of data lines, wherein the plurality of scanning lines and the plurality of light-emitting controlling lines extend in a row direction, and the plurality of data lines extend in a column direction;
a non-display area surrounding the display area, wherein the non-display area include a first non-display area and a second non-display area disposed on opposite sides of the display area in the row direction;
a first scanning driving circuit disposed at the first non-display area;
a second scanning driving circuit and a light-emitting controlling circuit disposed at the second non-display area, wherein the light-emitting controlling circuit includes a plurality of cascaded light-emitting controllers, and an output terminal of a light-emitting controller is electrically connected to at least one light-emitting controlling line; and
at least one notch,
wherein the display area includes an irregular-shaped side,
the irregular-shaped side is a common boundary between the display area and the first non-display area,
the irregular-shaped side includes at least one sub-edge, and
the at least one sub-edge is recessed towards an inside of the display area to form the at least one notch.

2. The display panel according to claim 1, wherein:
the first scanning driving circuit includes a first STV signal line and a plurality of cascaded first scanning drivers, wherein an output terminal of a first scanning driver is electrically connected to at least one scanning line, and an input terminal of a first-stage first scanning driver is electrically connected to the first STV signal line; and
the second scanning driving circuit includes a second STV signal line and a plurality of cascaded second scanning drivers, wherein an output terminal of a second scanning driver is electrically connected to at least one scanning line, and an input terminal of a first-stage second scanning driver is electrically connected to the second STV signal line.

3. The display panel according to claim 2, wherein:
the output terminal of the first scanning driver is electrically connected to at least two scanning lines; and
the output terminal of the second scanning driver is electrically connected to at least two scanning lines.

4. The display panel according to claim 2, wherein:
a scanning line has one end electrically to the output terminal of the first scanning driver and another end electrically to the output terminal of the second scanning driver.

5. The display panel according to claim 2, wherein:
output terminals of the first scanning drivers are electrically connected to odd-numbered scanning lines; and
output terminals of the second scanning drivers are electrically connected to even-numbered scanning lines.

6. The display panel according to claim 2, wherein:
output terminals of the first scanning drivers are electrically connected to even-numbered scanning lines; and
output terminals of the second scanning drivers are electrically connected to odd-numbered scanning lines.

7. The display panel according to claim 2, wherein:
the first non-display area includes a first sub-area disposed adjacent to the at least one sub-edge; and
the plurality of cascaded first scanning drivers are disposed in an area other than the first sub-area.

8. The display panel according to claim 1, wherein:
the light-emitting controlling circuit includes a third STV signal line, and
an input terminal of a first-stage light-emitting controller is electrically connected to the third STV signal line.

9. The display panel according to claim 1, wherein:
the output terminal of the light-emitting controller is electrically connected to at least two light-emitting controlling lines.

10. The display panel according to claim 1, wherein:
the non-display area further includes a third non-display area,
wherein:
the third non-display area and the display area are arranged in the column direction,
the non-display area includes at least one driving unit, and
the at least one driving unit is electrically connected to the first scanning driving circuit, the second scanning driving circuit, the light-emitting controlling circuit, and the plurality of data lines.

11. The display panel according to claim 10, wherein:
the non-display area includes two driving units: a first driving unit and a second driving unit,
wherein the first driving unit is electrically connected to the first scanning driving circuit and at least one data line, and
the second driving unit is electrically connected to the second scanning driving circuit, the light-emitting controlling circuit, and remaining data lines other than the at least one data line.

12. The display panel according to claim 10, wherein:
the at least one driving unit is an integrated circuit (IC) driving chip.

13. The display panel according to claim 1, wherein:
the display panel is a flexible display panel.

14. The display panel according to claim 1, wherein:
the display area includes at least two sub-display areas arranged in the row direction,
wherein:
the display panel may have a flat state and a bent state,
in the flat state, the at least two sub-display areas are arranged on a same plane, and
in the bent state, the at least two sub-display areas at least partially overlap in a direction perpendicular to the display panel.

15. A display device, comprising:
a display panel, wherein the display panel comprises:
a display area including a plurality of scanning lines, a plurality of light-emitting controlling lines and a plurality of data lines, wherein the plurality of scanning lines and the plurality of light-emitting controlling lines extend in a row direction, and the plurality of data lines extend in a column direction;
a non-display area surrounding the display area, wherein the non-display area include a first non-display area and a second non-display area disposed on opposite sides of the display area in the row direction;

a first scanning driving circuit disposed at the first non-display area;

a second scanning driving circuit and a light-emitting controlling circuit disposed at the second non-display area, wherein the light-emitting controlling circuit includes a plurality of cascaded light-emitting controllers, and an output terminal of a light-emitting controller is electrically connected to at least one light-emitting controlling line; and at least one notch, wherein:

the display area includes an irregular-shaped side, the irregular-shaped side is a common boundary between the display area and the first non-display area, the irregular-shaped side includes at least one sub-edge, and the at least one sub-edge is recessed towards an inside of the display area to form the at least one notch.

16. The display device according to claim 15, wherein:

the first scanning driving circuit includes a first STV signal line and a plurality of cascaded first scanning drivers, wherein an output terminal of a first scanning driver is electrically connected to at least one scanning line, and an input terminal of a first-stage first scanning driver is electrically connected to the first STV signal line; and the second scanning driving circuit includes a second STV signal line and a plurality of cascaded second scanning drivers, wherein an output terminal of a second scanning driver is electrically connected to at least one scanning line, and an input terminal of a first-stage second scanning driver is electrically connected to the second STV signal line.

17. The display device according to claim 15, wherein:

the display panel further includes a photosensitive device disposed in the at least one notch.

\* \* \* \* \*